United States Patent [19]

Kataoka et al.

[11] Patent Number: 4,640,573
[45] Date of Patent: Feb. 3, 1987

[54] LENS-ON-DISC TYPE OPTICAL SCANNING APPARATUS

[75] Inventors: Keiji Kataoka, Kawagoe; Susumu Saito, Hachioji, both of Japan

[73] Assignees: Hitachi, Ltd.; Hitachi Koki Co., Ltd., both of Tokyo, Japan

[21] Appl. No.: 460,804

[22] Filed: Jan. 25, 1983

[30] Foreign Application Priority Data

Feb. 24, 1982 [JP] Japan .................................. 57-27491

[51] Int. Cl.$^4$ ............................................. G02B 26/10
[52] U.S. Cl. ........................................ 350/6.1; 350/6.3; 350/254
[58] Field of Search ................. 350/6.1, 6.3, 6.8, 254, 350/452

[56] References Cited

U.S. PATENT DOCUMENTS

| | | | |
|---|---|---|---|
| 1,810,598 | 6/1931 | Cummings | 350/6.3 |
| 2,174,917 | 10/1939 | Dittmer | |
| 2,540,953 | 2/1951 | Kessler | |
| 3,619,033 | 11/1971 | MacMahon | |
| 4,383,755 | 5/1983 | Fedder et al. | 350/6.8 |

FOREIGN PATENT DOCUMENTS

| | | | |
|---|---|---|---|
| 0067721 | 5/1980 | Japan | 350/6.3 |
| 55-79409 | 6/1980 | Japan | |

Primary Examiner—John K. Corbin
Assistant Examiner—Rebecca D. Gass
Attorney, Agent, or Firm—Antonelli, Terry & Wands

[57] ABSTRACT

A lens-on-disc type optical scanner comprises a plurality of lenses of predetermined surface profile arranged on a disc along the circumferential direction of the disc. The disc is rotated so that a laser beam from a laser beam source passes sequentially through the lenses for optical scanning.

7 Claims, 12 Drawing Figures

LENS-ON-DISC TYPE OPTICAL SCANNING APPARATUS

This invention relates to an optical scanning apparatus using a laser beam for scanning, and more particularly to an optical scanning apparatus employing an optical scanner having lenses arranged on a disc (which scanner will be referred to hereinafter as a lens-on-disc type optical scanner.

The prior art and the present invention will be described with reference to the accompanying drawings, in which.

Figure 1:
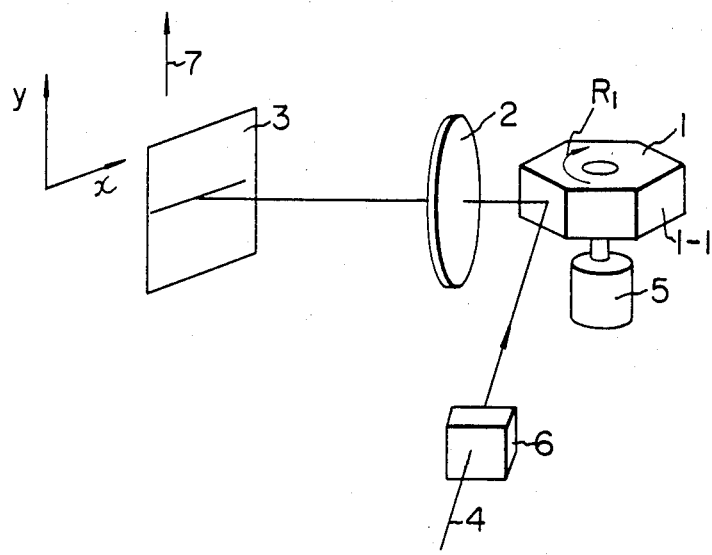
FIG. 1 shows the structure of a prior art optical scanning apparatus employing a rotary polyhedral mirror as its optical scanner.

In an optical scanning apparatus such as that used in a laser printer or a laser display, a rotary polyhedral mirror has been employed as its optical scanner. FIG. 1 shows an optical system in which a rotary polyhedral mirror is incorporated for scanning with a laser beam. Referring to FIG. 1, the rotary polyhedral mirror 1 is rotated in a direction as shown by the arrow R1, and a laser beam 4 is reflected by the mirror 1 for scanning on a display screen 3. A lens 2 focuses the laser beam 4 into a minute beam spot on the screen 3. A motor 5 causes the rotation of the rotary polyhedral mirror 1 in the direction of the arrow R1.

In such an arrangement, each reflecting surface 1—1 of the rotary polyhedral mirror 1 acts to produce a scanning line running in the x-direction on the display screen 3. For scanning in the y-direction on the screen 3, the screen 3 is moved at a predetermined constant speed in a direction as shown by the arrow 7, so that the entire area of the screen 3 can be scanned with the scanning line. The screen 3 may be a sheet of paper with or without a coating of a photosensitive material or may be a display surface having a phosphor coating. A beam modulator 6 modulates the intensity of the laser beam 4 so that laser recording or display with any desired beam intensity distribution on the screen 3 can be provided.

However, the rotary polyhedral mirror 1 may not always be manufactured to meet the severe dimensional requirement, and there may be the so-called tilt of the mirror facet in the case of which the lines normal to all of the reflecting surfaces of the rotary polyhedral mirror 1 do not define the same angle with the axis of rotation of the mirror 1. In such a case, irregularity occurs in the scanning pitch for laser recording or display on the screen 3 in the y-direction shown in FIG. 1. Suppose, for example, that the distance between the rotary polyhedral mirror 1 and the display screen 3, which may be a photosensitive screen, is 600 mm, and the allowable deviation of the scanning pitch on the photosensitive screen 3 is 0.025 mm. Then, an angular accuracy of more than $$\tfrac{1}{2} \times (0.025 \text{ mm}/600 \text{ mm}) = 2 \times 10^{-5} \text{ (radian)}$$

is required for each of the reflecting surfaces of the rotary polyhedral mirror 1. However, such an accuracy is almost the limit of the manufacturing accuracy, and the rotary polyhedral mirror 1 will become quite expensive even if such an extremely high accuracy could be achieved.

It is therefore a primary object of the present invention to provide an optical scanner which is free from the prior art defect pointed out above and is inexpensive.

The present invention which attains the above object provides a lens-on-disc type optical scanner in which a plurality of lenses are arranged on a support or disc along the circumference of the disc which is rotated for scanning. The disc in the optical scanner according to the present invention is made of a plastic material so that it can be mass-produced at a low cost by a duplication process. That is, a metal mold for forming the disc in the optical scanner according to the present invention is previously prepared so as to mass-produce the disc at a low cost by injection molding or pressing.

Figure 2:
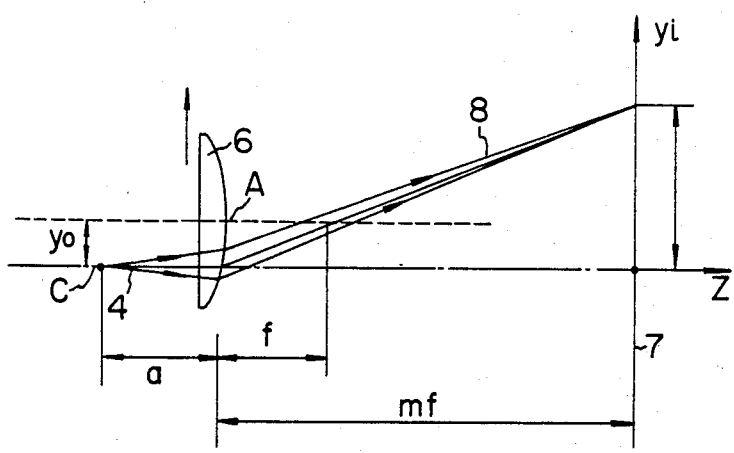
FIGS. 2 and 3 are diagrammatic views illustrating the basic principle of the lens-on-disc type optical scanner of the present invention.

FIG. 2 is a diagrammatic view illustrating the basic principle of the present invention employing a plurality of lenses for optical scanning.

Referring to FIG. 2, a laser beam 4 converging at a point C is incident upon a lens 6 disposed on a support or disc (not shown). The symbol A designates the center of the lens 6, and it is supposed now that the lens 6 is displaced by a distance $y_o$ in the y-direction from the optical axis of the incident laser beam 4. Then, the laser beam 8 emerging from the lens 6 forms an image on a screen 7 at a point $y_i$ which is approximately given by $y_i = m y_o$. In FIG. 2, the symbol f designates the focal distance of the lens 6, and mf designates the distance between the lens 6 and the screen 7. Therefore, the screen 7 can be optically scanned with a scanning width which is m times as long as the distance of translational movement of the lens 6.

Figure 3:
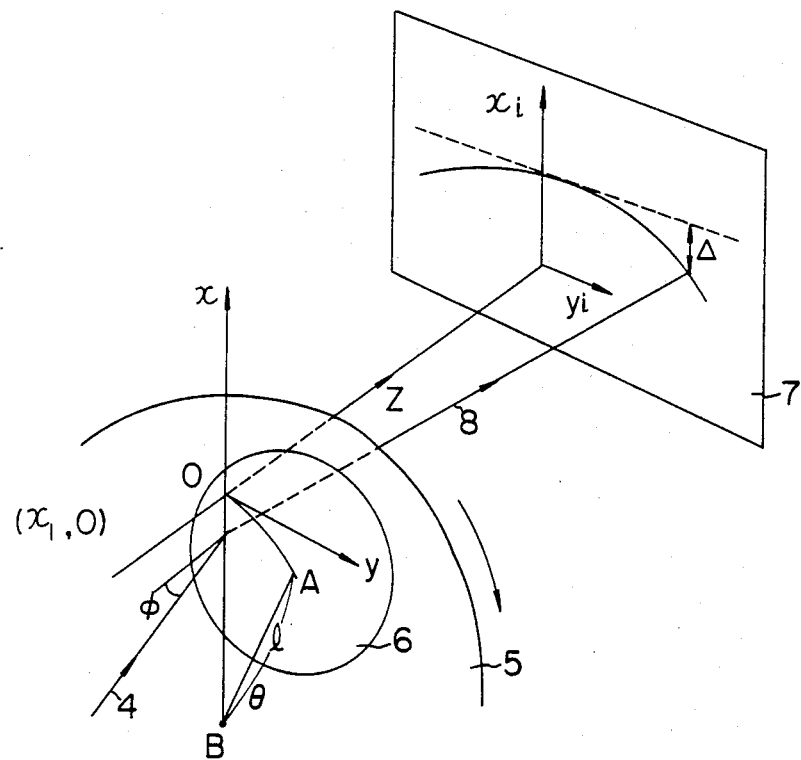

FIG. 3 is a diagrammatic view illustrating how to calculate the optical scanning characteristic when a laser beam 4 is incident upon a lens 6 disposed on a disc 5 whose center is indicated by a point B. It is supposed in FIG. 3 that the disc 5 rotates in a direction as shown by the arrow, and the center A of the lens 6 makes an angle $\theta$ with the x-axis. It is also supposed in FIG. 3 that the laser beam 4 is incident upon the lens 6 at a point ($x_1$, 0) in the x- and y-coordinates, and the laser beam 4 has an incidence angle $\phi$ with respect to the z-axis.

The center A of the lens 6 is spaced apart from the center B of the disc 5 by a distance l. As in the case of FIG. 2, the lens 6 has a focal distance f, and the distance between the lens 6 and a screen 7 is mf. Since the disc 5 rotates, a curved scanning line is ordinarily produced on the screen 7. However, by suitably selecting the incident point ($x_1$, 0) and incidence angle $\phi$ of the laser beam 4, it is possible to provide a rectilinear scanning line on the screen 7. The reason why such a rectilinear scanning line can be provided will be described with reference to FIGS. 4 and 5.

Figure 4:
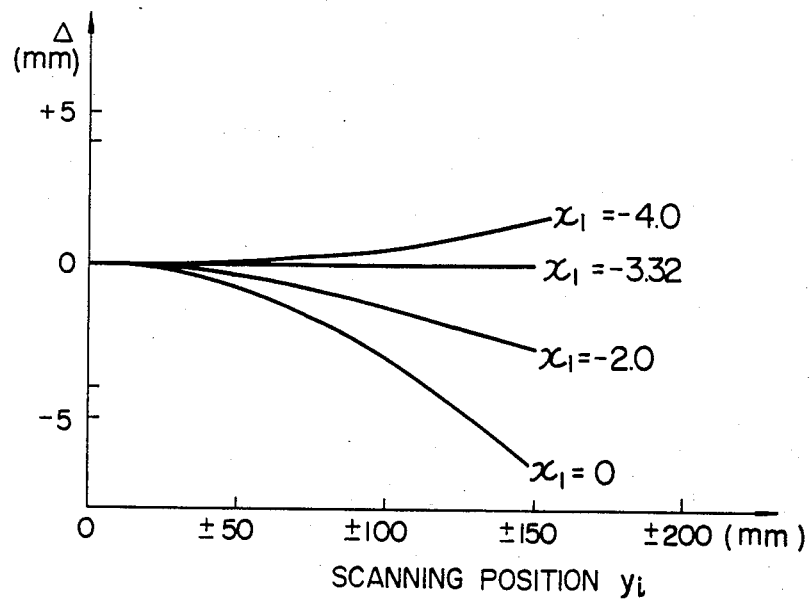
FIGS. 4 and 5 are characteristic curve diagrams showing the results of calculation of the amount of deviation of the scanning line in the arrangement shown in FIG. 2.
Figure 5:
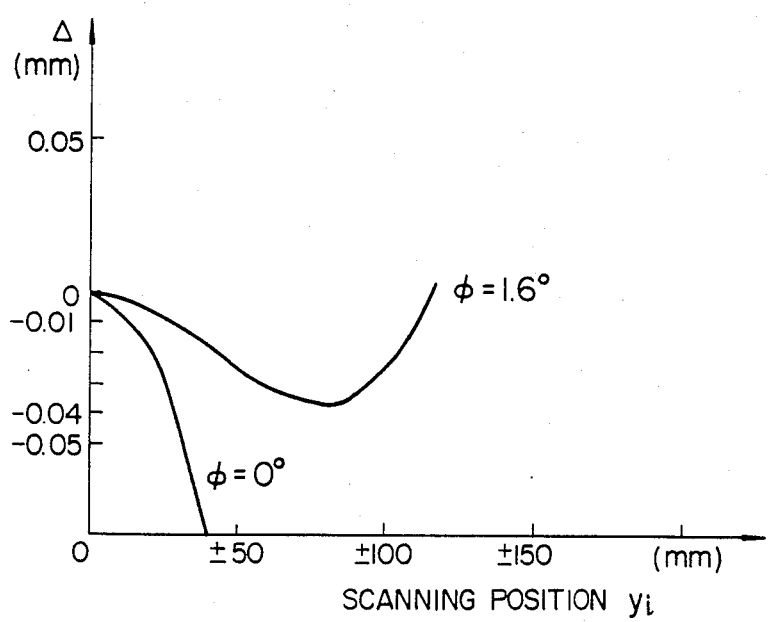

FIGS. 4 and 5 are diagrams showing the relation between the deviation $\Delta$ of the scanning line and the scanning position $y_i$ on the screen 7. Herein, the deviation $\Delta$ of the scanning line is defined as follows:

$$\Delta = x_i(Y_i = Y_i) - x_i(Y_i = 0).$$

More precisely, FIG. 4 is a graph showing the results of calculation of the relation between $\Delta$ and $y_i$ using the incidence point $x_1$ of the laser beam 4 as a parameter, while FIG. 5 is a graph showing the results of calculation of the above relation using the incidence angle $\Delta$ as a parameter, and it will be seen that substantially rectilinear optical scanning can be achieved. That is, FIG. 4 illustrates that the deviation $\Delta$ is zero irrespective of the value of the scanning position $y_1$ when $x_1 = -3.32$. Also, FIG. 5 illustrates that the deviation $\Delta$ at $\phi = 1.6°$ is $-0.04$ mm at the maximum when the scanning position $y_i$ is within the range of $0 \leq y_i < 120$ (mm), and the curve can be considered to be substantially flat or rectilinear. The results of calculation shown in FIGS. 4 and 5 are based on $f = 50$ mm, $m = 15$, $l = 100$ mm and $\phi = 0°$.

Figure 6:
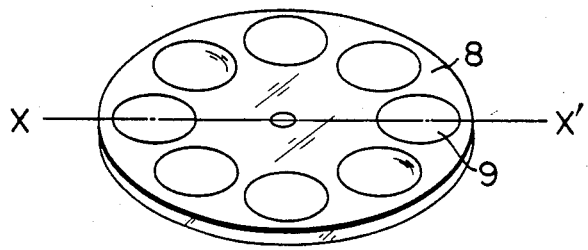
FIG. 6 is a perspective view of an embodiment of the lens-on-disc type optical scanner according to the present invention.
Figure 7:
FIG. 7 is a sectional view taken along the line X—X' in FIG. 6.

FIG. 6 shows the structure of an embodiment of the lens-on-disc type optical scanner according to the present invention. The lens-on-disc type optical scanner shown in FIG. 6 comprises a disc 8 made by injection molding or pressing a plastic material by use of a metal mold, and a plurality of lenses 9 having a curved surface profile and arranged along the circumferential direction of the disc 8. The lenses 9 may be molded integrally with the disc 8 using plastic material. Suitable plastic materials include an acrylic resin, a polycarbonate resin and a polystyrene resin. FIG. 7 is a sectional view taken along the line X—X' in FIG. 6 to illustrate that lenses 9 are formed on the disc 8.

Figure 8:
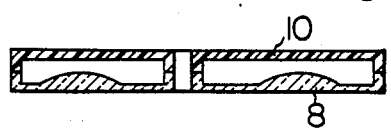
FIGS. 8 and 9 are sectional views of other embodiments of the present invention.

FIG. 8 is a sectional view of a structure in which a flat cover 10 of another plastic material covers the optical scanner shown in FIG. 7 so as to protect the lens surface against damage. The flat plastic cover 10 is bonded to the disc 8 of the lens-on-disc optical scanner by an adhesive.

Figure 9:
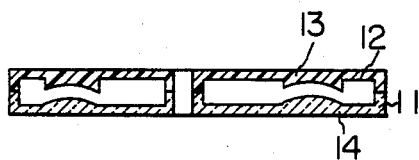

FIG. 9 is a sectional view showing the structure of another embodiment comprising the combination of two lens-on-disc type optical scanner elements 11 and 12. These optical scanner elements 11 and 12 include lenses of different surface profiles respectively. That is, the optical scanner element 11 includes lenses 14 having a convex surface profile, while the optical scanner element 12 includes lenses 13 having a concave surface profile. These optical scanner elements 11 and 12 are firmly bonded together at their circumferential edges. According to the lens-on-disc type optical scanner shown in FIG. 9, optical scanning with corrected aberration of the optical system can be effected by suitably selecting the refractive index of each of the discs and the curved surface profile of the lenses on each of the discs.

Figure 10:
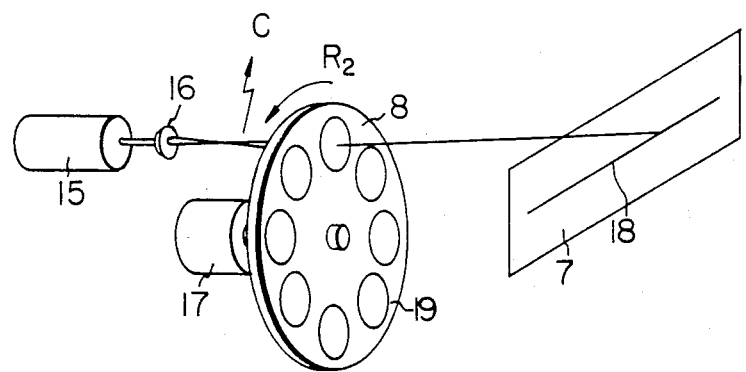
FIGS. 10 and 11 are diagrammatic views of optical systems in each of which the lens-on-disc type optical scanner of the present invention is incorporated.

FIG. 10 is a diagrammatic view of an optical system in which a lens-on-disc type optical scanning apparatus 19 provided by mounting a motor 17 on the optical scanner shown in FIG. 6 is incorporated. A laser beam from a laser beam source 15 is converged at a point C by a lens 16 and is then incident upon one of the lenses arranged on the disc 8. The disc 8 is rotated in a direction as shown by the arrow $R_2$ by the motor 17 so that an optical scanning line 18 is formed on a screen 7.

Figure 11:
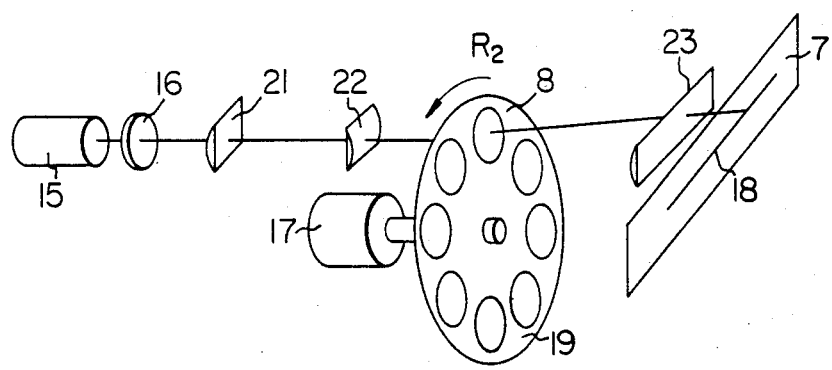

FIG. 11 shows an optical system in which cylindrical lenses 21, 22 and 23 are additionally inserted in the optical system shown in FIG. 10. The arrangement shown in FIG. 11 further improves the rectilinearity of the optical scanning line.

Figure 12:
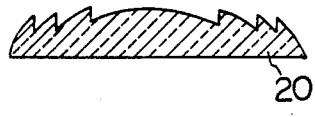
FIG. 12 is a sectional view of another embodiment of the present invention.

Although the foregoing description has referred to the arrangement in which the lenses are concentrically arranged on the disc, it is apparent that the lenses may be arranged in a helical pattern or any suitable one of other patterns. Further Fresnel lenses 20 having a surface profile as shown in FIG. 12 may be arranged on a disc 8 in a pattern as shown in FIG. 6.

What is claimed is:

1. A lens-on-disc type optical scanner comprising a first support in the form of a disc, a plurality of lenses arranged on said first disc along the circumferential direction of said disc and having a first predetermined surface profile, a second support in the form of a disc, and a plurality of lenses arranged on said second disc along the circumferential direction of said disc and having a second predetermined surface profile different from said first predetermined surface profile, said first and second discs being bonded together at their circumferential edges, wherein a scanning plane located at a predetermined position is scanned by a laser beam passing through said lenses sequentially by rotating said first and second discs.

2. A lens-on-disc type optical scanning apparatus according to claim 1, wherein said plurality of lenses are disposed on a circle having a center which is the same as the rotation axis of each said disc.

3. A lens-on-disc type optical scanning apparatus according to claim 1, wherein each said disc and said lenses arranged on the associated disc are made of resin and made in a body.

4. A lens-on-disc type optical scanning apparatus according to claim 1, wherein said first surface profile is convex and said second surface profile is concave.

5. A lens-on-disc type optical scanning apparatus according to claim 1, wherein said first and second discs are arranged so that said first surface profile is disposed opposite said second surface profile.

6. A lens-on-disc type optical scanning apparatus according to claim 5, wherein said first surface profile is convex and said second surface profile is concave.

7. A lens-on-disc type optical scanning apparatus accoridng to claim 5, wherein each said disc and said lenses arranged on the associated disc are made of resin and made in a body.

* * * * *